United States Patent [19]

Nagaoka

[11] Patent Number: 5,643,458
[45] Date of Patent: Jul. 1, 1997

[54] SLUDGE DEHYDRATING PRESS AND METHOD FOR TREATING SLUDGE

[75] Inventor: Tadayoshi Nagaoka, Mihara-machi, Japan

[73] Assignee: Nagaoka International Corporation, Japan

[21] Appl. No.: 365,851

[22] Filed: Dec. 29, 1994

[30] Foreign Application Priority Data

Jan. 12, 1994 [JP] Japan ................................ 6-014013

[51] Int. Cl.$^6$ ............................ B01D 21/02; B01D 37/00
[52] U.S. Cl. ...................... 210/702; 100/37; 100/116; 210/342; 210/770
[58] Field of Search ............................ 210/702, 770, 210/780, 806, 808, 224, 230, 315, 324, 329, 342, 406, 416.1, 445, 350, 497.01; 100/37, 45, 110, 116, 126, 127, 130

[56] References Cited

U.S. PATENT DOCUMENTS

| | | | |
|---|---|---|---|
| 838,841 | 12/1906 | Carlson | 110/116 |
| 1,566,496 | 12/1925 | Maus | 110/116 |
| 1,686,095 | 10/1928 | Manning | 210/406 |
| 4,276,265 | 6/1981 | Gillespie | 210/497.01 |

FOREIGN PATENT DOCUMENTS

| | | |
|---|---|---|
| 0480176 | 4/1992 | European Pat. Off. . |
| 0587080 | 3/1994 | European Pat. Off. . |
| 314906 | 6/1956 | Switzerland . |

*Primary Examiner*—Joseph W. Drodge
*Attorney, Agent, or Firm*—Hedman, Gibson & Costigan, P.C.

[57] ABSTRACT

A sludge dehydrating press device includes an outer screen case in which sludge to be treated is filled, the outer screen case having a screen surface in at least a part thereof, a press for pressing sludge filled in the outer screen case, one or more inner screen cases disposed slidably in the outer screen case including a screen surface extending in a direction crossing the direction of pressing by the press and having continuous slits and the inner screen cases having also a space into which water extracted from the sludge flows, and a positioning device for positioning the inner screen cases to a predetermined position after completion of pressing by the press. The screen surface of the outer screen case preferably is made of a wedge wire screen having a flat inside surface. The press device may further include an extracted water removing screen tube coaxially with the outer screen case.

11 Claims, 8 Drawing Sheets

SLUDGE DEHYDRATING PRESS AND METHOD FOR TREATING SLUDGE

BACKGROUND OF THE INVENTION

This invention relates to a dehydrating press used for treating sludge such as sludge accumulated on the river bed, sludge in a sewage disposal plant and sludge removed in carrying out the shield driving method, particularly suitable for use for treating sludge accumulated on the river bed, and a method for treating sludge by using this dehydrating press.

Known in the art of dehydrating sludge is a method according to which sludge is dried in the sun. This method requires a large area of land and nowadays it is unrealistic to use this method in view of scarcity of land available for use for such purpose. A sludge dehydrating method currently used employs a chemical treatment of sludge prior to a dehydrating process. This method attempts to facilitate dehydration of sludge by treating sludge with a coagulant before dehydration.

Dehydration methods using a mechanical force are also used. One of these methods is a vacuum filtration which dehydrates sludge on a filtering cloth provided on the surface of a rotary drum by utilizing vacuum. A second method is a pressure filtration according to which sludge is pressed intermittently with a diaphragm in a filtering frame and then sludge is subjected to dehydration though a filtering cloth.

A third method is dehydration by a centrifugal separator. According to this method, water is removed from sludge by utilizing difference in the specific gravity when the centrifugal separator is rotated at a high speed.

A fourth method is dehydration by forming pellets. According to this method, sludge added with a high polymer coagulant and water glass is rotated in a slowly rotating drum and thereby sludge is formed into dehydrated pellets.

An ideal method for treating sludge is one which can dehydrate sludge containing a large ratio of water such as sludge accumulated on the river bed which is extremely difficult to be dehydrated and regenerate the dehydrated sludge as useful soil for land reclamation for gardening soil.

None of the above described prior art methods however has proved satisfactory from this standpoint.

The method utilizing vacuum filtration requires an apparatus of a large scale and this apparatus has not a large dehydration capacity. This method is also disadvantageous in that clogging of the filtering cloth tends to occur in a relatively short period of time.

The method utilizing pressure filtration is superior in dehydrating capacity to the vacuum filtration. This method however is not exempt from the disadvantages that it requires an apparatus of a large scale and clogging of the filtering cloth tends to occur in a short period of time.

The method using a centrifugal separator is not effective for dehydrating sludge on the river bed and besides the centrifugal separator is very expensive.

The method of forming sludge into pellets in a relatively simple method and disorders in the system seldom take place. The degree of dehydration attained by this method is not sufficiently high so that this method cannot be applied to all types of sludge including sludge on the river bed.

As described above, the prior art dehydration methods have various defects and a satisfactory dehydration method was not found for a long time. For this reason, in some cases sludge on the river bed is left on the river bed with a solidifying agent added therein. Unless a satisfactory dehydration method is developed for treating such type of sludge, the sludge treatment will become a serious environmental problem.

It is, therefore, an object of the present invention to provide a sludge dehydrating device and method which have eliminated the above described disadvantages of the prior art methods and can dehydrate sludge efficiently with a relatively simple structure and without causing the problem such as clogging of a filtering cloth.

SUMMARY OF THE INVENTION

In the process of repeated experiments carried out for solving the above described problem, the inventor of the present invention has found that, by forming a screen case of a circular or square cross section with a screen having a continuous slit such as a wedge wire screen and pressing sludge filled in this screen case with a hydraulic press, water is surprisingly extracted continuously from the slit of the screen case while dehydrated sludge remains in the screen case without flowing out of the slit.

Further experiments have revealed that while the dehydration by the screen case is effective in a case where a relatively small amount of sludge is filled in a relatively small screen case, when a relatively large amount of sludge is filled in the screen case, water which is smoothly extracted initially becomes increasingly difficult to be extracted as pressing of sludge continues until the amount of extracted water ceases to increase and instead the amount of sludge which leaks out of the packing of the piston head increases with the result that a sufficient dehydration effect cannot be obtained. An analysis of distribution of water containing rate in various parts of sludge in the screen case has proved that the water containing ratio of the sludge is lower in a portion near the screen of the screen case and higher in a portion remote from the screen. This signifies that the density of sludge near the screen increases as dehydration progresses to a further extent in this portion than in other portion as pressing of sludge continues with the result that extraction of water out of the slit of the screen is prevented by this high density portion of sludge so that sufficient dehydration of a portion remote from the screen is not made.

On the basis of this finding, the inventor of the present invention has found that by not only filling and pressing sludge filled in an outer screen case and thereby causing water to be extracted from inside of the outer screen case to outside of the outer screen case but by disposing an inner screen case in sludge filled in the outer screen case and causing water to be extracted into the hollow inside space of this inner screen case by pressing the sludge, water can be extracted from all portions of the sludge and the problem can be solved more effectively.

Further studies and experiments by the inventor of the present invention have led to a finding, which has resulted in the present invention, that, by constructing an outer screen case of a circular or rectangular cross section with a screen such as a wedge wire screen which can form continuous slits and also constructing an inner screen case with both of their end surfaces formed with continuous slit screens plates, disposing this inner screen case slidably in the outer screen case in such a manner that the continuous slit screen plates cross the direction of pressing by press means, and filing sludge on the outside of the screen plates and pressing the sludge, water is extracted continuously through both of the slits of the outer and inner screen cases while the sludge is prevented from flowing through the slits.

For achieving the object of the invention, a sludge dehydrating press comprises an outer screen case in which sludge to be treated is filled, said outer screen case having a screen surface in at least a portion thereof, press means for pressing sludge filled in said outer screen case, one OF more inner screen cases disposed slidably in said outer screen case comprising a screen surface extending in a direction crossing the direction of pressing by said press means and having continuous slits and said inner screen cases having also a space into which water extracted from the sludge flows, and positioning means for positioning the inner screen cases to a predetermined position after completion of pressing by said press means.

According to the invention, as the sludge in the outer screen case is pressed by the press means, water extracted from the sludge is separated and flows out through the outer screen case and also flows into the space defined in each inner screen case and is collected therefrom. Thus, the volume of the sludge is reduced by the volume of water extracted and collected. The inner screen case is caused to slide in the direction of pressing by the press means due to pressure applied by the press means while collecting water extracted from the sludge. Thus, disposing a necessary number of the inner screen cases (one or more) at positions where water can be extracted and collected over the entire portion of the sludge filled in the outer screen case and pressing the sludge by the pressing means, water is extracted over the entire portion of the sludge and flows out through the outer screen case as well as flows into the inner screen case and, after completion of pressing, sludge in the form of cake having a sufficiently reduced water containing rate remains in the outer screen case.

As an object of an experiment for dehydration of sludge by pressing, the inventor has selected sludge on the river bed in a lower part of a river flowing through a large city which is most difficult to separate water and solid. As a chemical treatment prior to pressing, a coagulant was added to sludge to gel it.

In the experiment, a dehydrating method by pressing was employed. This method is simple and can be carried out with a relatively small apparatus. As the element of the dehydrating device, a wedge wire screen which has little likelihood of clogging was employed.

Two dual surface inner screen cases consisting of wedge wire screens were produced and sludge was filled in an outer screen case consisting of a wedge wire screen in such a manner that the sludge is placed between the two inner screen cases. Pressing of sludge was made initially with a relatively low pressure and the pressure was gradually increased. Water was extracted significantly from the initial stage and continuously extracted from the sludge.

In extracting water from sludge, it has been taken for granted, as shown in the prior art dehydrating devices, to use a filtering material of a fine mesh such as a filtering cloth. It is quite surprising and was not expected before the experiment of the present invention that water can be extracted from sludge through slits of a wedge wire screen while preventing flowing out of sludge through the same slits.

As the outer screen used in the present invention, a screen case of a proper shape such as a cylindrical or square tube having an inlet for sludge and an outlet for compressed sludge is used. The dehydration effect can be improved by forming a screen surface in at least a part of surfaces constituting the screen case such as a side surface. Particularly, in an embodiment of the invention, the outer screen case has a screen surface in at least a part thereof which screen surface has a flat inside surface. As the screen of the present invention, screens having a function of excluding water from pressed sludge such as screens made of wire-mesh, synthetic fiber, perforated or slitted plate, filtering cloth reinforced by a reinforcing member, sintered metal and porous ceramic were used in experiments. Numerous experiments have resulted in the finding that the screen having of continuous slits such as a wedge wire screen has the least clogging tendency and exhibits the most excellent water collecting efficiency.

The pressing means for pressing sludge includes a press section such as a pressing plate which contacts and presses sludge contained in the outer screen case and a known press section drive mechanism including a piston rod connected to this press section and drive means for reciprocably driving this piston rod.

The inner screen case disposed in the outer screen case may have any desired shape such as a square tube or a cylinder, or a tube of a triangular or pentagonal cross section.

As the screen of the inner screen case, experiments have been made by using screens made of various materials which have a function of causing extracted water to flow into the space inside of the inner screen case such as continuous slit screens such as a wedge wire screen, as well as screens made of wire-mesh, synthetic fiber, porous plate, filtering cloth, sintered metal and porous ceramic. It has been found as a result of the experiments that the most successful screen for the purpose of the invention, i.e., one having the least tendency to clogging and by far excellent water collecting efficiency, is a screen having continuous slits such as the wedge wire screen and that the other types of screens cannot sufficiently achieve the object of the present invention.

It is, therefore, a feature of the press according to the invention that the inner screen case has a screen surface having continuous slits.

A continuous slit screen surface extending in the direction of pressing may be provided on one side of the inner screen case but it is preferable to provide the continuous screen surfaces on both end surfaces of the inner screen case for enhancing the dehydrating efficiency.

The smaller the width of the slits of the continuous slit screen is, the more safely can water be extracted from sludge. This allows a relatively rough adjustment of initial pressure for pressing of sludge and even insufficient chemical pretreatment. Such small width of the slits, however, will sacrifice the sludge dehydrating efficiency and work efficiency.

In the experiments, widths of 0.1, 0.2, 0.3, 0.4 and 0.8 mm have been employed. An optimum design will be to adopt a slit width which will satisfy both requirements for a high dehydrating efficiency and a high sludge treating work efficiency.

The optimum slit width may vary depending upon the technique of pressing and the chemical pretreatment technique. It has been found by the experiments that sludge itself varies depending upon a place where it is collected. That is, sludge collected from a river bed in the lower part of a river flowing through a large city has a lower degree of gelling and requires a longer time for increasing pressure for pressing than sludge collected from a river bed in the middle part of the same river notwithstanding that the amount of coagulant added is larger by 30 percent.

It has also been found that the amount of necessary coagulant and the speed of increasing pressure for pressing differ between sludge collected from the river bed and slimy sludge produced by the shield driving method.

In an optimum design of the continuous slit screen, it is necessary to select an optimum slit width and a distance between the opposite screen surfaces having regard to the type of sludge, the efficiency of chemical treatment, initial pressure for pressing and time required for increasing pressure gradually.

In any case, it is necessary to determine the width of slits at a smaller value than the width of the screen wire. If the slit width is the same as or larger than the wire width, that will be a case where the slit width is so large that sludge itself will flow out through the slit or a case where, if the slit width is so small that sludge will not flow out, the wire width will be so small that the wire will be deformed under pressure applied by pressing by the pressing means.

The inner screen case or cases are disposed at a position or positions where separation and collection of water from sludge can be made in all portions of the sludge contained in the outer screen case. This position is selected in consideration of various factors including the shape and size of the outer screen case and nature of sludge to be treated so that water can be extracted from sludge located at a point furthest from the screen surface. If the outer screen case is a large one and it is difficult to collect extracted water from the entire sludge with a single inner screen case, plural inner screen cases may be disposed to collect water from all portions of the sludge. It is an important feature and advantage of the present invention that extracted water can be collected from all portions of sludge to be treated by properly selecting the positions and number of the inner screen cases in the outer screen case even in a case where the outer screen case is of a large capacity and contains a large amount of sludge to be treated.

The dehydrating effect can be improved by adding a proper known coagulant to sludge to be treated before starting pressing in the dehydrating press according to the invention. According to the invention, however, it is possible to dehydrate sludge sufficiently and form the dehydrated sludge into a cake even without using any coagulant. Since the addition of a coagulant to sludge to be treated before starting of a dehydrating process was indispensable in the prior art sludge dehydrating methods, the present invention provides a drastic improvement over the prior art methods in this respect.

In one preferred aspect of the invention, the inner screen case is free from either the press means or the outer screen case and is slidable inside of the outer screen case as pressing by the press means progresses. It is a feature of the present invention to cause the inner screen case to slide freely in the outside screen case by utilizing pressure produced by the pressing means and transmitted through sludge. By this structure, a connecting means such as a piston rod which connects the inner screen case with the pressing means can be omitted so that the press as a whole can be made in a compact design.

In a case where the outer screen case including its bottom wall is formed with a screen, the entire surface of the inner screen case may be made with a screen. In this case, water collected in the inner screen case can be removed during pressing to the outside of the press from the bottom portion of the inner screen case through the bottom wall made of the screen of the outer screen case. In a case where the bottom wall of the outer screen case is made of a solid plate, it is not possible to remove extracted water to the outside of the press during pressing and, therefore, it is necessary to provide an extracted water storing section in the inner screen case for storing water extracted from sludge. This extracted water storing section can be provided by forming a box with plates in the lower portion of the inner screen case in such a manner that this box has a bottom plate which can be opened and closed when necessary. After completion of pressing, the bottom plate of this box is opened to release water stored in the box to the outside of the press.

In another aspect of the invention, the press further comprises an extracted water removing screen tube disposed coaxially in the outer screen case and passing through the inner screen case for removing water extracted from the sludge. Water extracted from sludge by pressing flows into this extracted water removing screen tube in addition to the inner screen case for being excluded out of the press whereby the dehydrating effect is further enhanced. As the screen used for the extracted water removing screen tube, any screen including a continuous slit screen, wire mesh screen and perforated plate screen may be used if it has a function of excluding water extracted from sludge to the outside.

In another aspect of the invention, the press further comprises vacuum generation means connected to the extracted water removing screen tube for sucking out the extracted water to the outside of the press. This enhances the dehydrating effect further.

Pressing may be made in one direction and an opposite direction separately or simultaneously. Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

FIG. 1 to FIG. 7 show an embodiment of the press made according to the invention. A sludge dehydrating press 1 includes an outer screen case 2, press means 3 and inner screen cases 4.

Figure 2:
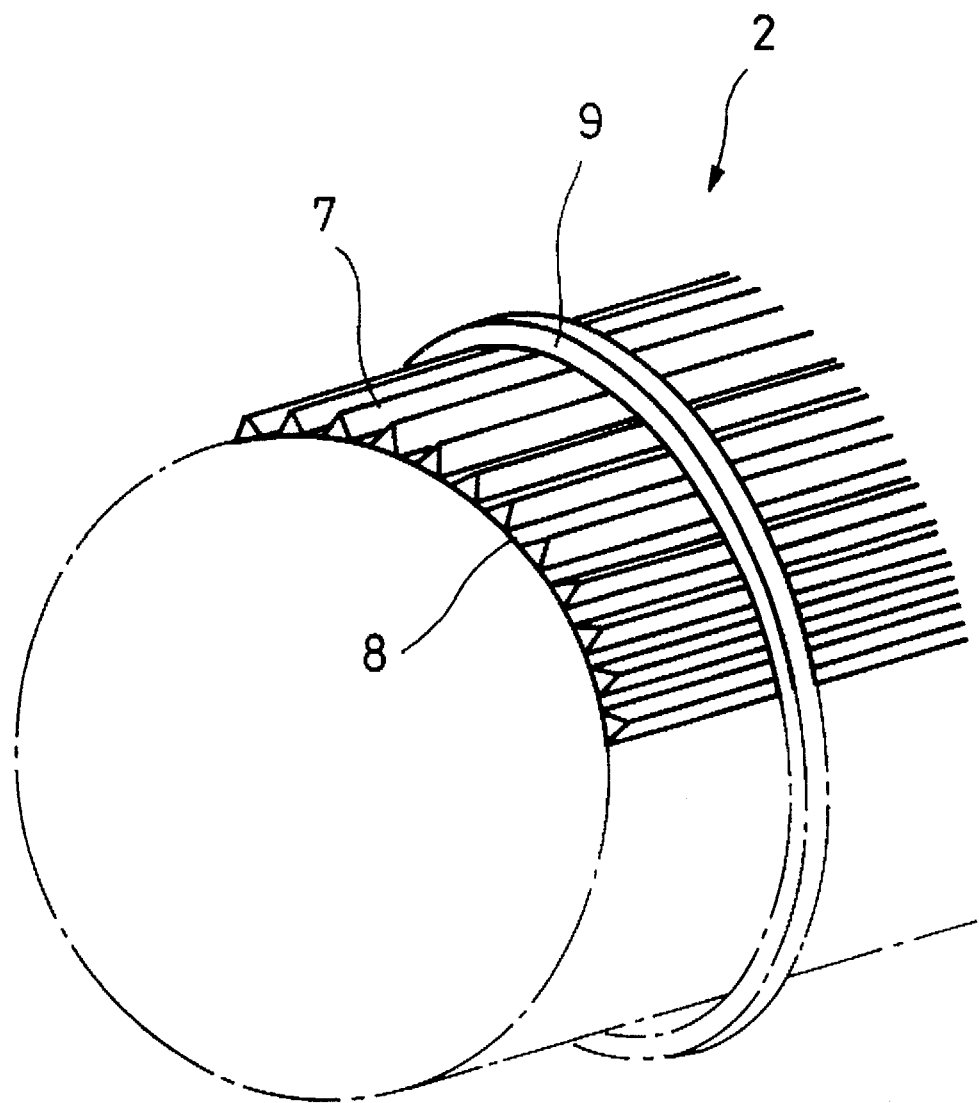
FIG. 2 is a perspective view, partly in section, of an outer screen case.

The outer screen case 2 has a generally cylindrical shape and has end rings 5 and 6. Between the end rings 5 and 6 are arranged, as best illustrated in FIG. 2, a plurality of wedge wires 7 at a predetermined interval in the circumferential direction in such a manner that axially extending continuous slits 8 are defined between the respective wedge wires 7. These wedge wires 7 are disposed with their flat surfaces facing inside. Support rings 9 are arranged about these wedge wires 7 with a predetermined interval in the axial direction and the wedge wires 7 and the support rings 9 are welded to each other at points of contact therebetween.

Sludge inlets 10 are formed in the top portion of the outer screen case 2 at a certain interval and these sludge inlets 10 are connected to a sludge supply source (not shown) through a pump 0 provided for supplying sludge to the outer screen case 2 under a high pressure.

Figure 3A:
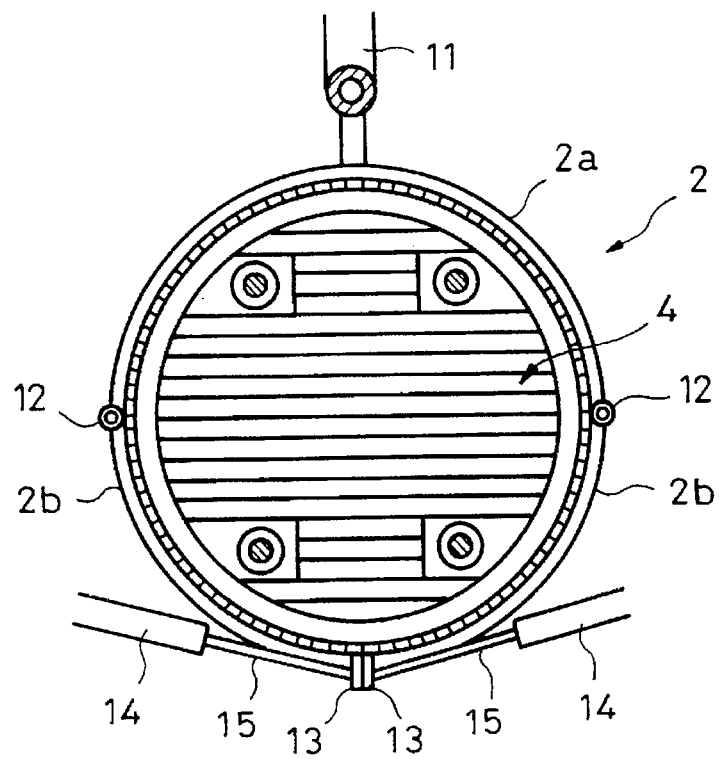
FIGS. 3A and 3B are views taken along arrows A—A in FIG. 1.
Figure 3B:
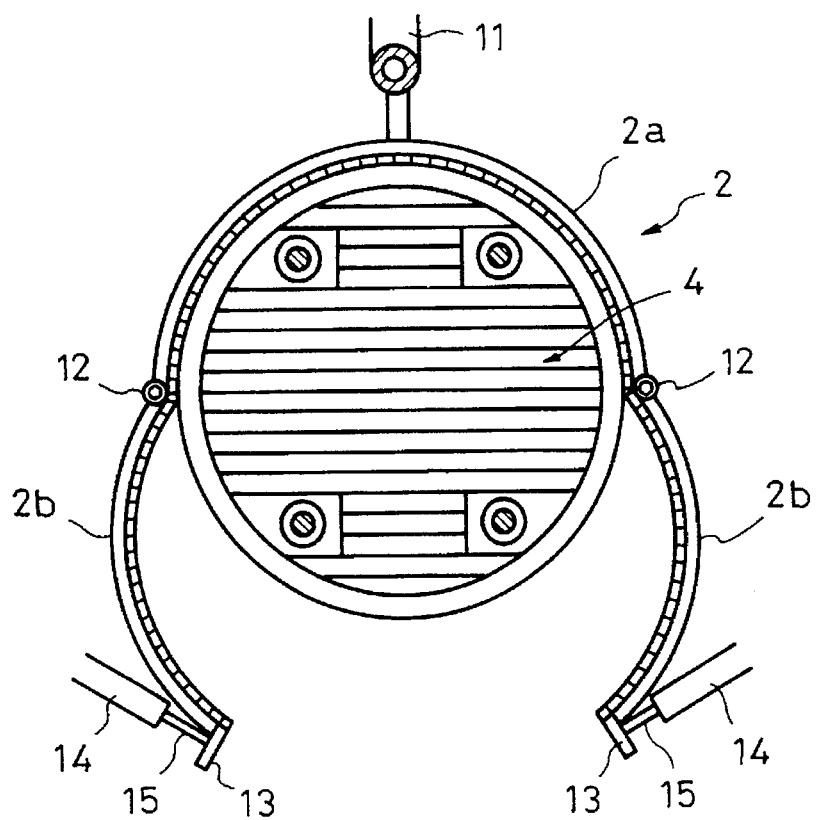

As shown in FIGS. 3A and 3B, in the present embodiment, the portion of the outer screen case 2 other than the end rings 5 and 6 is divided circumferentially into an upper section and a lower section and the lower section is further divided circumferentially into two sections whereby an upper screen section 2a and lower screen sections 2b, 2b are formed. The lower screen sections 2b, 2b are hingedly connected to the upper screen section 2a by means of a pair of hinges 12, 12 extending in the axial direction. Plates 13 extending in the axial direction are fixedly secured to the bottom portions (opposite end portions) of the lower screen sections 2b, 2b. Pistons 15, 15 extending normally to the longitudinal direction of the plates 13, 13 and fitted in hydraulic cylinders 14, 14 are fixedly secured at their base portions to the plates 13, 13. By operating the hydraulic cylinders 14, 14, the lower screen sections 2b, 2b can be opened as shown in FIG. 3B and closed as shown in FIG. 3A.

The wedge wires 7 of the upper screen section 2a are welded at their end portions to the inside surfaces of the end rings 5 and 6.

Figure 4:
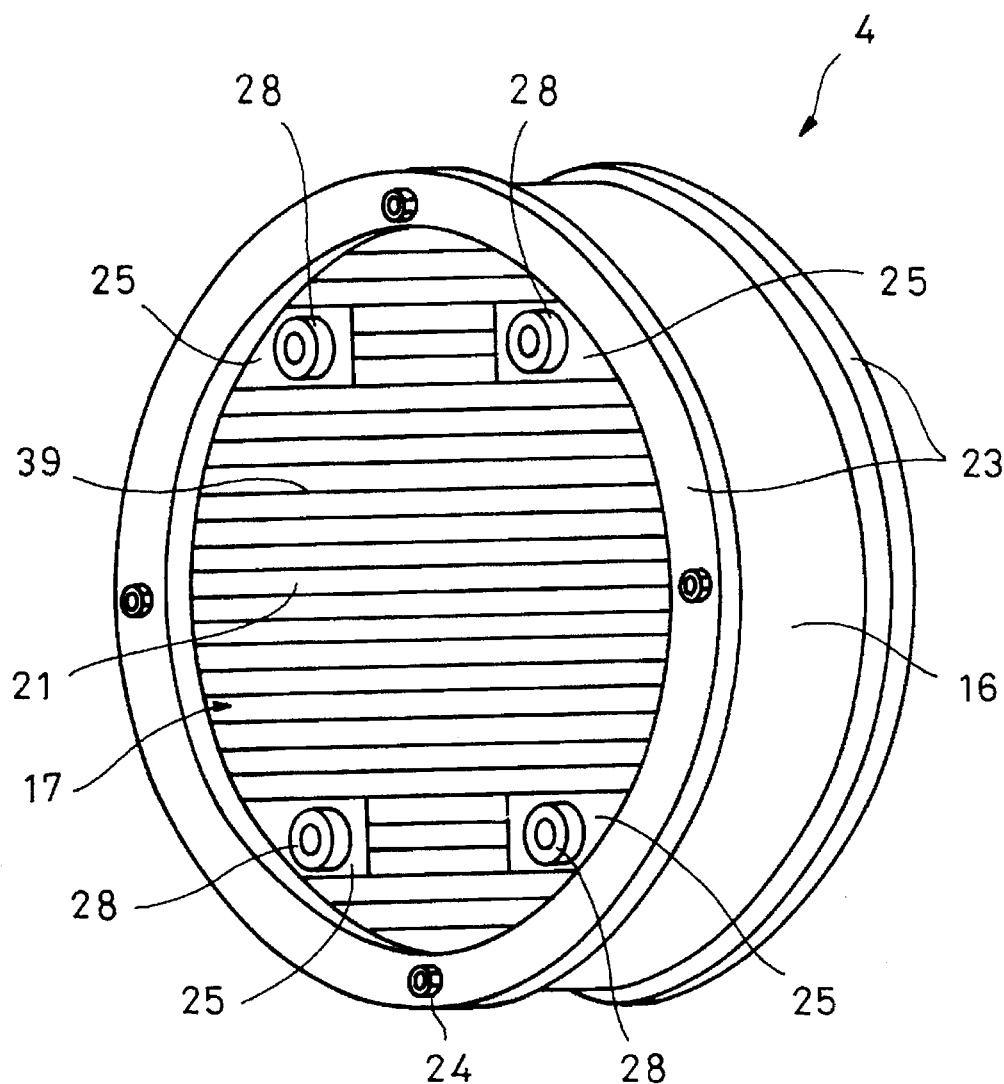
FIG. 4 is a perspective view of an inner screen case.

The inner screen cases 4 are disposed in the outer screen case 2 at a predetermined interval d to define a chamber 40 for filling sludge therein. Each of the inner screen cases 4 is constructed, as best shown in FIG. 4, by providing continuous slit screen plates 17, 17 on both ends of a short cylindrical side plate 16. These continuous slit screen plates 17, 17 extend in a direction crossing the direction of pressing by the press means 3. A space 18 (FIG. 6) is defined between the screen plates 17, 17 for receiving water extracted from sludge. Each of the screen plates 17, 17 includes support rods 20 which are arranged to extend in the vertical direction at a certain interval and wedge wires 21 which extend in a horizontal direction with their flat surfaces facing outside and are welded to the support rods 20 at crossing points therebetween. A slit 39 of a predetermined width is defined between respective adjacent wedge wires 21.

Figure 5:
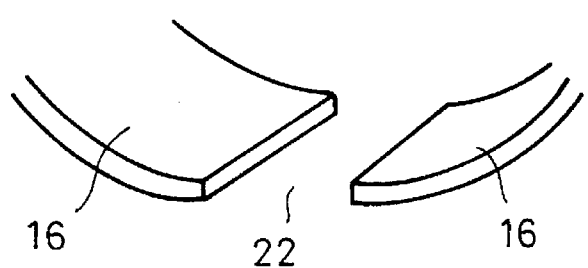
FIG. 5 is a view showing the bottom portion of the inner screen case.
Figure 6:
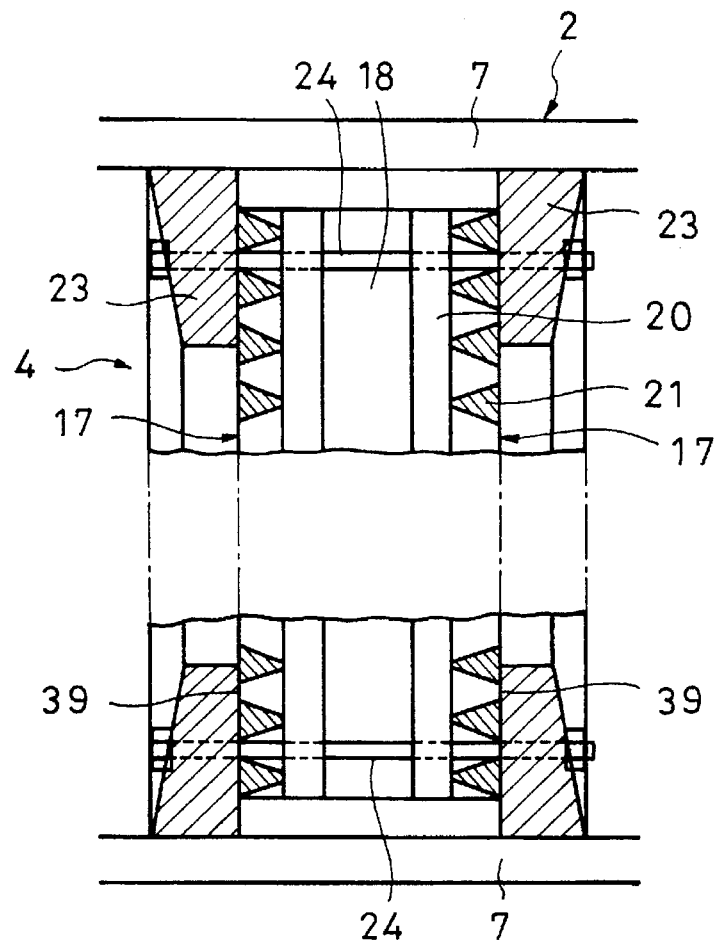
FIG. 6 is a partial sectional view showing the top and bottom portions of the inner screen case.

The inner screen case 4 has such a diameter that, when the inner screen case 4 is disposed concentrically in the outer screen case 2, there is a slight gap between the inner peripheral surface of the outer screen case 2 and the outer peripheral surface of the inner screen case 4. An opening 22 shown in FIG. 5 is formed in the bottom portion of the annular side plate 16 of the inner screen case 4 to exclude water collected in the space 18.

A pair of slide rings 23, 23 made of an elastic material such as urethane rubber are fixedly secured to the screen plates 17, 17 by means of bolts 24. The slide rings 23 have an outer diameter which is equal to or slightly larger than the inner diameter of the outer screen case 2 and, by pushing the slide rings 23 into the outer screen case 2, the inner screen case 4 can slide in the axial direction in the outer screen case 2 with a sealed state being formed between the inner peripheral surface of the outer screen case 2 and the outer peripheral surface of the inner screen case 4.

Figure 7:
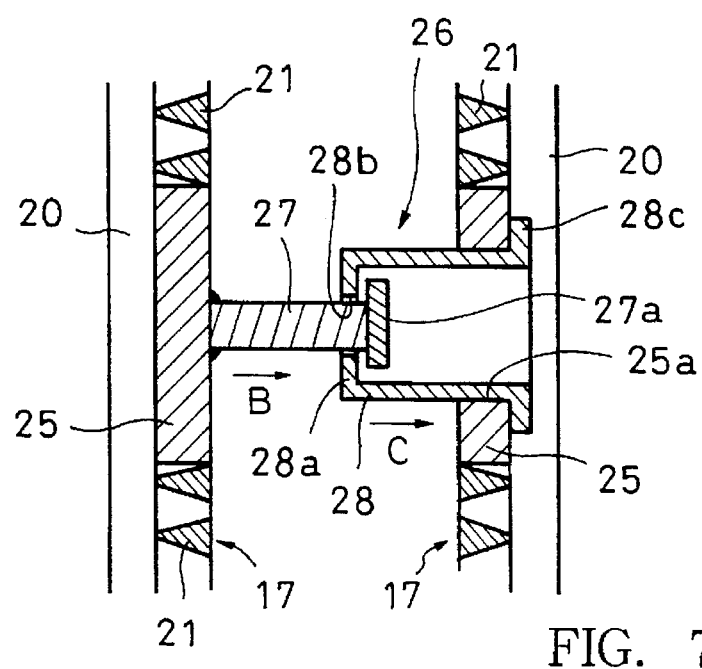
FIG. 7 is a partial sectional view showing an example of the positioning means of the inner screen case.

At four corners of each of the screen plates 17 of the inner screen case 4 are disposed securing plates 25 which are welded at one end portion thereof to the side plate 16. On the outer surface of the securing plate 25 fixed to one of the screen plates 17 is welded, as shown in FIG. 7, a pin 27 which constitutes a positioning means 26 of the inner screen case 4, whereas on the outer surface of the securing plate 25 fixed at a corresponding position to the pin 27 to the opposite screen plate 17 of the adjacent inner screen case 4 is formed a circular opening 25a and a cylinder 28 which constitutes the rest of the positioning means 26 is axially slidably fitted in the opening 25a. The pin 27 has a head 27a of an enlarged diameter and the cylinder 28 has a circular opening 28b in an end portion 28a on the side of the pin 27. This opening 28b has a diameter which is slightly larger than the diameter of the pin 27 and is smaller than the diameter of the enlarged head 27a of the pin 27. The pin 27 is slidably fitted in the opening 28b. The cylinder 28 has an enlarged head portion 28c of a diameter which is larger than the diameter of the opening 25a of the securing plate 25. On one of the screen plates 17 of each inner screen case 4 is secured the pin 27 and on the other screen plate 17 is secured the screen 28. FIG. 4 shows a state of the screen plate 17 on which the cylinders 28 are secured to the securing plates 25.

The pressing means 3 used for pressing sludge includes a pressing disk 29 which is fitted in the outer screen case 2, a piston rod 30 connected to the pressing disk 29, a drive mechanism (not shown) for reciprocating this piston rod 30 and a screen case 31 secured fixedly to the inside of the pressing disk 29. The screen case 31 is of a construction similar to the inner screen case 4 excepting that a screen plate is not provided on the side of the pressing disk 29 and is connected to the screen plate 17 of the adjacent inner screen case 4 by means of the positioning means 26. The press means 3 is provided on both ends of the outer screen case 2.

The operation of this dehydrating press will now be described.

Figure 1:
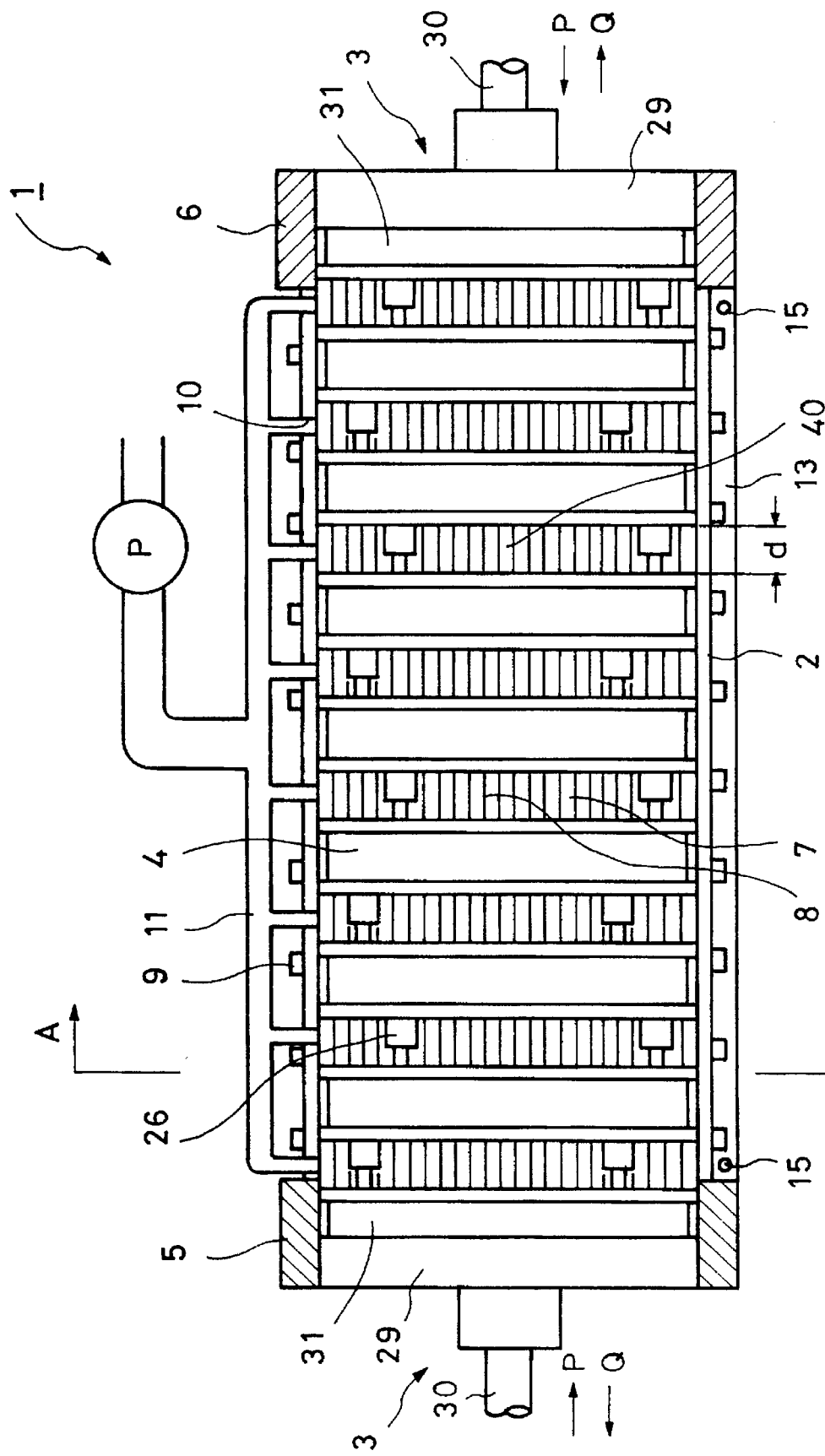
FIG. 1 is a side view, partly in section, of an embodiment of the sludge dehydrating press made according to the invention.

FIG. 1 shows a state before filling sludge in the press 1. In this state, the interval between the respective inner screen cases 4, that is, the width d of the sludge filling chamber 40, is at the maximum. The positioning means 26 is in the state shown in FIG. 7. In this state, the pin 27 is pulled to the maximum extent away from the cylinder 28 and the enlarged head 27a of the pin 27 is engaged with the inner surface of the end portion 28a of the cylinder 28. The enlarged head portion 28a of the cylinder 28 is engaged with the inner surface of the securing plate 25. In this state, the inner screen cases 4 are located at locations in the outer screen case 2 where the sludge inlets 10 can communicate with the sludge filling chambers 40.

Then, the pump P is driven to fill sludge to be treated to the sludge filling chambers 40 in the outer screen case 2 through the supply pipe 11 and sludge inlets 10. Upon completion of filling of sludge, the piston 30 of the press means 3 is driven in the direction of arrow P to press the sludge in the sludge filling chambers 40. Since pressure applied by the press means 3 is applied uniformly to the sludge in all sludge filling chambers 40, the sludge in the respective sludge filling chambers 40 is compressed and water extracted from the sludge flows out to the outside of the press 1 through the slits 8 of the outer screen case 2 and also flows into the space 18 of the inner screen cases 4 and drops to the outside of the press 1 through the bottom opening 22 of the inner screen cases 4 and the bottom slits 8 of the outer screen case 2. The volume of the sludge is reduced by the amount of extracted water.

During this pressing operation, the pin 27 of the positioning means 26 relatively slides in the direction of arrow B in FIG. 7 in the cylinder 28 while the cylinder 28 slides in the direction of arrow C due to reaction of the sludge received at the end portion 28a of the cylinder 28. Thus, the interval between the screen plates 17, 17 of the adjacent inner screen cases 4, i.e., the width d of the sludge filling chamber 40, is reduced.

Upon compressing the sludge until the width d of the sludge filling chamber 40 is reduced to a predetermined value, pressing is stopped. Then, the hydraulic cylinders 14, 14 (FIG. 3) are operated to open the lower screen sections 2b, 2b of the outer screen case 2 as shown in FIG. 3B to allow the cake of the compressed sludge to fall to a cake receiving plate (not shown) placed below the press 1. Thereafter, the hydraulic cylinders 14, 14 are operated to close the lower screen sections 2b, 2b of the outer screen case 2 and thereby to restore the press 1 to the state shown in FIG. 3A. The piston 30 of the pressing means 3 is moved in the direction of arrow Q in FIG. 1 to restore the inner screen cases 4 to the position shown in FIG. 1 for a next sludge dehydrating operation.

Figure 8:
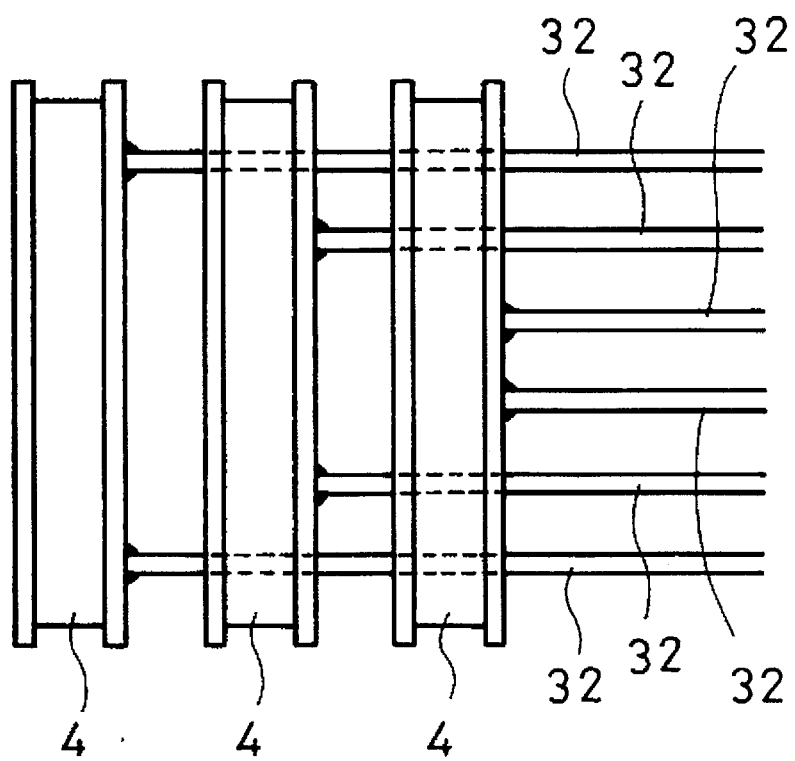
FIG. 8 is a schematic view showing another example of the positioning means.

The positioning means for positioning the inner screen cases 4 is not limited to the one which is a combination of the pin 27 and the cylinder 28 as used in the above described embodiment but various other structures may be used. FIG. 8 schematically shows another example of the positioning means. In this example, Positioning rods 32 are fixedly secured to the respective inner screen cases 4 individually. The positioning rods 32 secured to the inner screen case 4 which is located remotely as viewed from the operation end of the positioning rods 32 pass through the inner screen case 4 which is located nearer to the operation end of the positioning rods 32. In the case of using this positioning means, the inner screen cases 4 are restored to the start position after the sludge pressing operation by pushing the inner screen cases 4 by means of the positioning rods 32.

Figure 9:
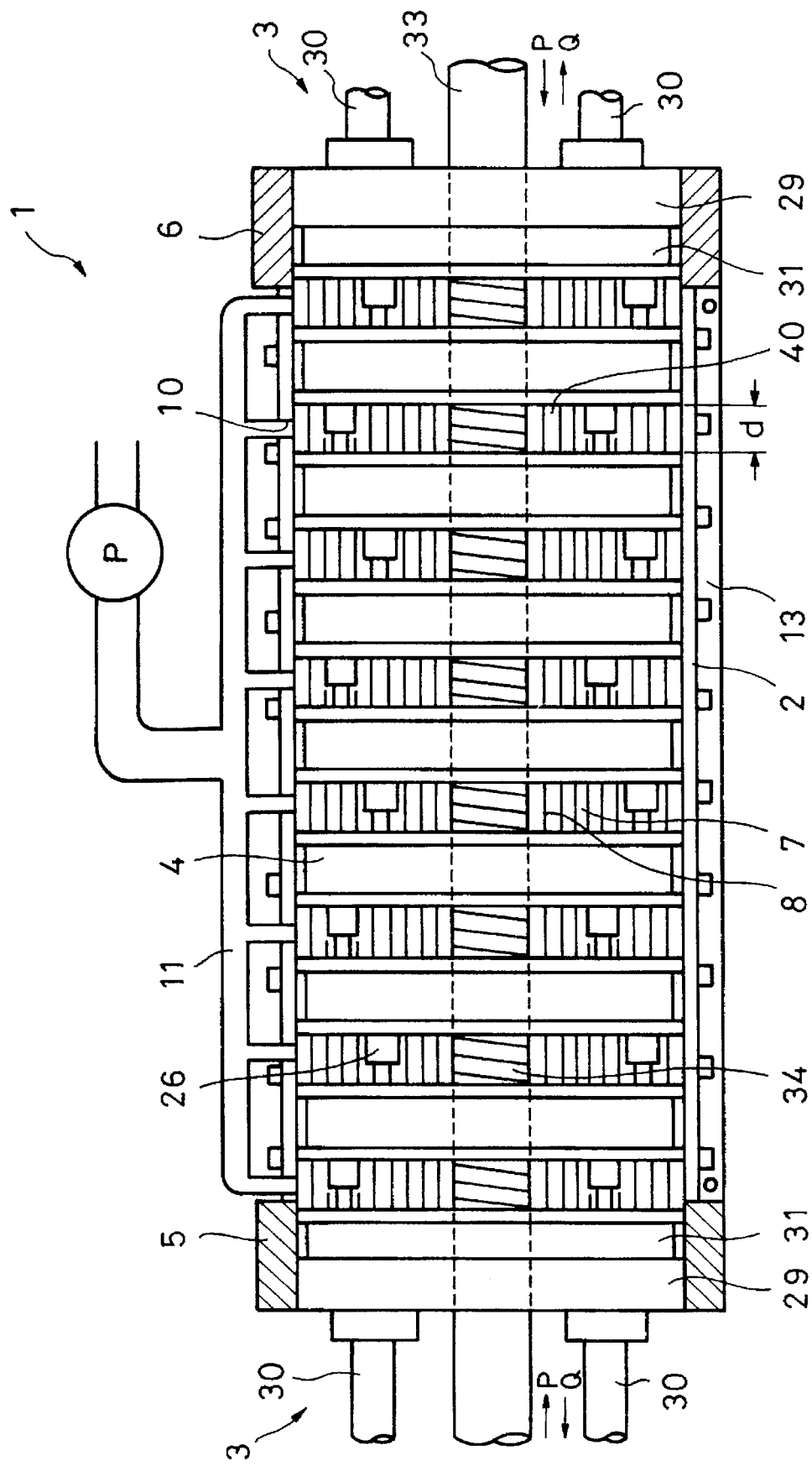
FIG. 9 is a sectional view, partly in section, of another embodiment of the invention.

FIG. 9 shows another embodiment of the invention. In this embodiment, the same or similar component parts to those shown in FIG. 1 are designated by the same reference characters and description thereof will be omitted.

This embodiment is different from the embodiment shown in FIG. 1 in that an extracted water removing screen tube 33 is provided in the central portion of the outer screen case 2. This screen tube 33 is fixedly secured to a frame (not shown) of the press 1 and extends through the inner screen cases 4 and the pressing disks 29 and screen cases 31 of the press means 3 through openings formed therein so that the inner screen cases 4, pressing disks 29 and screen cases 31 can slide axially with respect to the screen tube 33. A portion of the screen tube 33 corresponding to the outer screen case 2 is made of a wedge wire screen tube 34 consisting of axially extending support rods and a spiral wedge wire wound about the outer surfaces of the support rods, so that a part of water extracted by compression of the sludge flows into this wedge wire screen tube 34 and is removed outside through an outlet (not shown) of the screen tube 34. This construction enhances the sludge dehydrating effect of the press 1 and is particularly effective in a case where the press 1 has the sludge filling chambers 40 of a large capacity.

Figure 10:
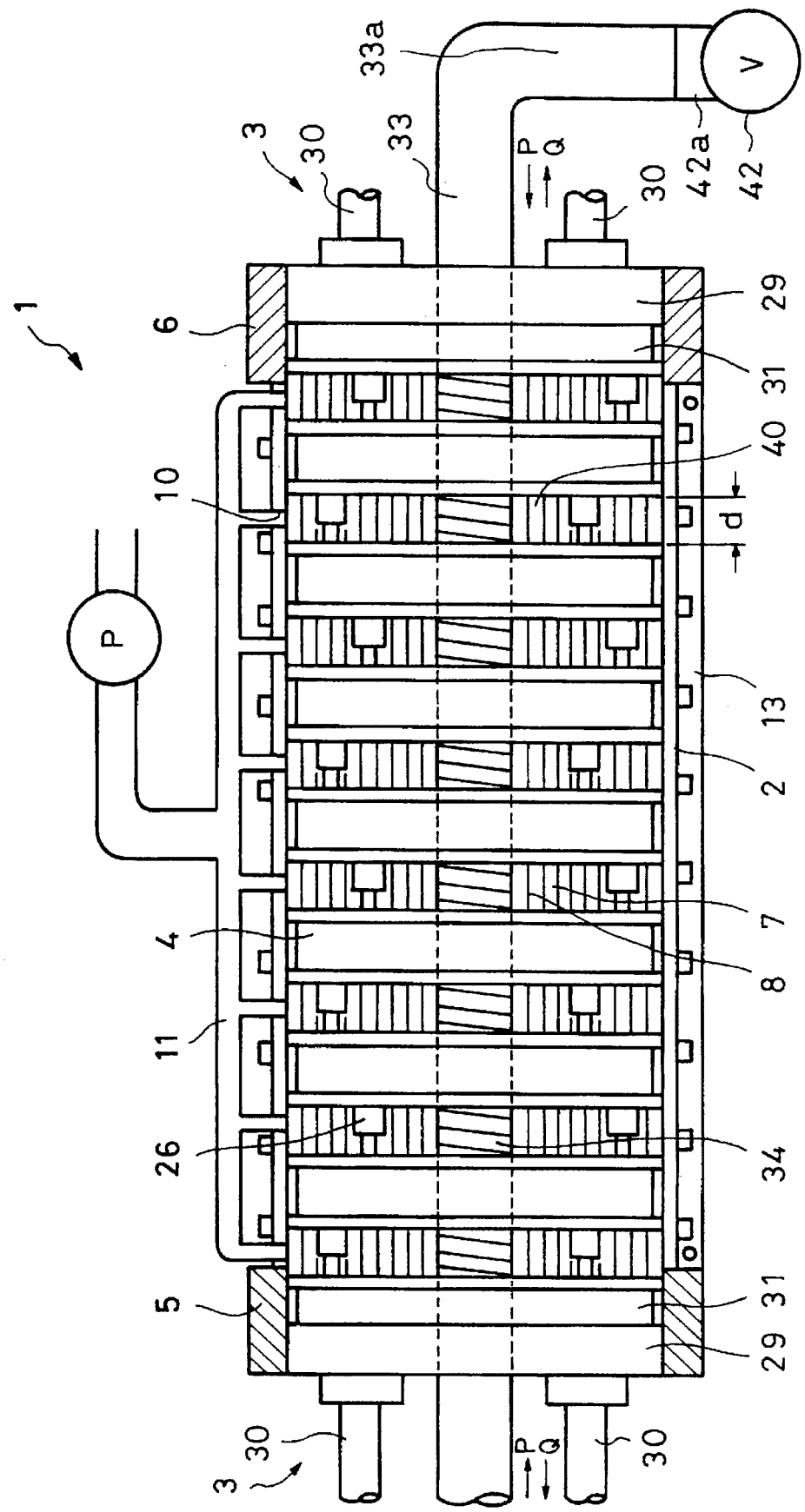
FIG. 10 is a sectional view, partly in section, of another embodiment of the invention.

FIG. 10 shows a still another embodiment of the invention. In this embodiment, a suction inlet 42a of a known vacuum generation means 42 such as a vacuum pump is connected to an outlet 33a of the extracted water removing screen tube 33. By driving this vacuum generation means 42, vacuum is generated to suck out the extracted water and thereby to enhance the sludge dehydrating effect further.

What is claimed is:

1. A sludge dehydrating press having a central axis said press comprising:

an outer screen case for containing sludge to be treated, said outer screen case having a screen surface in at least a part thereof, said outer screen case being divided circumferentially into an upper section and a lower section; said lower section being further divided circumferentially into two sections of said lower section which are individually hingedly connected to said upper section;

means connected to each of said two sections of said lower section for opening and closing said two sections of said lower section;

press means for pressing sludge contained in said outer screen case in a direction of pressing which is parallel to the axis of said dehydrating press;

one or more inner screen cases disposed slidably in said outer screen case each comprising a screen surface comprising continuous slits and which extends in a direction crossing said direction of pressing by said press means, having first and second end surfaces and said one or more inner screen cases each having respective space which are on both sides of said one or more inner screen cases into which water extracted from the sludge flows; and positioning means for positioning said one or more inner screen cases to a predetermined position after completion of pressing by said press means.

2. A press as defined in claim 1 wherein, for each inner screen case said continuous slits of said screen surface are provided on said first and second end surfaces.

3. A press as defined in claim 1 wherein said screen surface of the outer screen case consists of a wedge wire screen having a flat inside surface.

4. A press as defined in claim 1 wherein said one or more inner screen cases are each slidable inside of said outer screen case as pressing by said press means progresses.

5. A press as defined in claim 1 which further comprises an extracted water removing screen tube disposed coaxially in the outer screen case and extending through each of said one or more inner screen cases for removing water extracted from the sludge.

6. A press as defined in claim 5 which further comprises vacuum generation means connected to said extracted water removing screen tube for sucking out the extracted water.

7. A method for treating sludge comprising steps of:

filling said respective spaces which are on both sides of each of said one or more inner screen cases which are in the outer screen case of the sludge dehydrating press as defined in claim 1, with sludge to be treated; and dehydrating the sludge by pressing the sludge by said pressing means.

8. A method as defined in claim 7 wherein said pressing is made in one direction and also in an opposite direction.

9. A method as defined in claim 7 wherein said pressing is made while increasing pressure gradually.

10. A method for treating sludge comprising steps of:

filling respective spaces which are on both sides of each of each of one or more inner screen cases which are in an outer screen case of a sludge dehydrating press having a central axis, said press comprising an outer screen case for containing sludge to be treated, said outer screen case having a screen surface in at least a part thereof, said outer screen case being divided circumferentially into an upper section and a lower section; said lower section being further divided circumferentially into two sections of said lower section which are individually hingedly connected to said upper section;

means connected to each of said two sections of said lower section for opening and closing said two sections of said lower section; press means for pressing sludge contained in said outer screen case in a direction which is parallel to the axis of said press;

one or more inner screen cases disposed slidably in said outer screen case each comprising a screen surface comprising continuous slits and which extends in a direction crossing said direction of pressing by said press means and said one or more inner screen cases having also a space into which water extracted from the sludge flows; and positioning means for positioning said one or more inner screen cases to a predetermined position after completion of pressing by said press means; and dehydrating the sludge by pressing the sludge by said pressing means wherein sludge to be treated is subjected to a chemical pretreatment using a coagulant before the sludge is pressed.

11. A sludge dehydrating press having a central axis, said press comprising:

a cylindrical outer screen case for containing sludge to be treated, said cylindrical outer screen case having a screen surface in at least a part thereof, said cylindrical outer screen case being divided circumferentially into an upper section and a lower section; said lower section being further divided circumferentially into two sections of said lower section which are individually hingedly connected to said upper section;

means connected to each of said two sections of said lower section for opening and closing said two sections of said lower section;

press means for pressing sludge contained in said cylindrical outer screen case in a direction of pressing which is parallel to the axis of said dehydrating press;

one or more cylindrical shaped inner screen cases each of which are adapted to fit slidably within a cylindrical outer screen case for a sludge dehydrating press, each inner screen case comprising a top and bottom surface on said cylindrical shaped screen case wherein the top and bottom surface comprises slits which extend in a direction crossing the direction of pressing when press means are applied to said cylindrical shaped inner screen case, said cylindrical inner screen case having a space between, said top and bottom surface into which water extracted from the sludge flows, said cylindrical inner screen case being formed by a cylindrical plate between said top and bottom surfaces, said cylindrical plate having an opening to drain water from said space between said top and bottom surfaces;

positioning means for positioning each of said one or more inner screen cases to a predetermined position after completion of pressing by said press means.

* * * * *